(12) United States Patent
Liu

(10) Patent No.: US 8,736,965 B2
(45) Date of Patent: May 27, 2014

(54) BEAM COMBINER

(75) Inventor: Te-Wei Liu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 229 days.

(21) Appl. No.: 13/434,432

(22) Filed: Mar. 29, 2012

(65) Prior Publication Data

US 2013/0033757 A1    Feb. 7, 2013

(30) Foreign Application Priority Data

Aug. 5, 2011    (TW) .............................. 100127980 A

(51) Int. Cl.
*G02B 27/14*    (2006.01)

(52) U.S. Cl.
USPC ........................................................ 359/634

(58) Field of Classification Search
USPC .................... 359/634, 485.01, 485.02, 485.03
See application file for complete search history.

(56) References Cited

U.S. PATENT DOCUMENTS 5,959,773 A * 9/1999 Gagnon .................... 359/485.02

* cited by examiner

*Primary Examiner* — Joseph P Martinez
(74) *Attorney, Agent, or Firm* — Tracy M. Heims; Apex Juris, pllc

(57) ABSTRACT

A beam combiner includes a first lens and a second lens coated with specific optical films. The first color light beam enters the first lens via a first incidence surface with an incidence angle of Brewster's angle. The second color light beam enters the first lens via the second incidence surface with an incidence angle of zero degree. The third color light beam enters the second lens via the third incidence surface with an incidence angle of zero degree. The first, the second, and the third color light beams transmit in the same path after the splitting face to form the composite light beam and come out via an exit surface.

23 Claims, 5 Drawing Sheets

BEAM COMBINER

BACKGROUND OF THE INVENTION

1. Field of the Invention

The present invention relates generally to an optical apparatus, and more particularly to a RGB beam combiner.

2. Description of the Related Art

As shown in FIG. 1, a conventional RGB beam combiner 3, which is equipped in a projector to combine color light beams L1~L3 into one beam L4, includes a first prism 51 and a second prism 52, a third prism 53, and a fourth prism 54 coupled together. Between the first and the second prisms 51, 52 and between the third and the fourth prisms 53, 54 respectively are provided with a film to allow the first the second color light beams L1, L2 to transmit through, and reflect the third color light beam L3. Between the second the third prisms 52, 53 and between the first and the fourth prisms 51, 54 respectively are provided with a film to allow the second and the third color light beams L2, L3 to transmit through, and reflect the first color light beam L1.

Therefore, when the first color light beam L1 enters the beam combiner 3 via the first prism 51, the fourth prism 54, and the third prism 53 respectively, finally, they L1, L2, L3 will be combined to form a composite light beam L4 and come out via the second prism 52.

With advancement in technology, more and more people use projectors in seminar, video conference, or just simply watch movie. The projectors have to be made smaller and lighter for portability. The conventional beam combiner 3 is constructed by four prisms 51~54, and the color light beams L1~L3 enters the beam combiner 3 in three different directions that the projector must leave a large space for the prisms 51~54 and for the beams L1~L3 transmission. It can't be equipped in a small projector.

To overcome the aforesaid drawback, an improved beam combiner 4, taught in U.S. patent 20070091449, includes a first beam splitter 61, a second beam splitter 62 and a third beam splitter 63, wherein the third beam splitter 63 is parallelogram between the first and the second beam splitters 61 and 62. Between the first and the third beam splitters 61 and 63 is provided with a film to allow the second color light beam L2 to transmit through and reflect the first color light beam L1, and between the third and second beam splitters 63 and 62 is provided with a film to allow the first and the second color light beams L1, L2 to transmit through and reflect the third color light beam L3.

Therefore, the color light beams L1~L3 may be combined in the second beam splitter 62 to form the composite light beam L4. The size of the beam combiner 4 is smaller and the first and the third color light beams L1, L3 enter the beam combiner 3 in the same direction that the beam combiner 3 needs a smaller space in the projector. However, it still has its limitations and that needs to be improved.

SUMMARY OF THE INVENTION

The primary objective of the present invention is to provide a smaller beam combiner to combine three different color light beams.

According to the objective of the present invention, a beam combiner for combining a first color light beam, a second color light beam, and a third color light beam to form a composite light beam includes a first lens and a second lens. The first lens has a first incidence surface coated with a first beam-splitting film, a second incidence surface, a splitting face coated with a second beam-splitting film, and an exit surface, wherein the first incidence surface is parallel to the splitting face, an included angle between the first incidence surface and the second incidence surface is ninety degrees minus Brewster's angle, the first beam-splitting film allows the first color light beam to transmit through and reflects the second color light beam, and the second beam-splitting film allows the third color light beam to transmit through and reflects the first light beam and the second color light beam. The second lens has a third incidence surface and a pass-through face, wherein the pass-through face faces the splitting face of the first lens, and the third incidence surface is parallel to the exit surface of the first lens.

The first color light beam enters the first lens via the first incidence surface with an incidence angle of Brewster's angle, and then is reflected by the second beam-splitting film on the splitting face to come out of the first lens via the exit surface.

The second color light beam enters the first lens via the second incidence surface with an incidence angle of zero degree, and then is reflected by the first beam-splitting film on the first incidence surface and the second beam-splitting film on the splitting face in sequence to come out of the first lens via the exit surface.

The third color light beam enters the second lens via the third incidence surface with an incidence angle of zero degree, and then leaves the second lens via the pass-through face and enters the first lens via the splitting face to come out of the first lens via the exit surface.

The first, the second, and the third color light beams transmit in the same path after the second beam-splitting film on the splitting face to form the composite light beam.

The present invention provides two lenses, with specific optical films, and the incidence angle of the first color light beam L1 is limited in Brewster's angle to combine the color light beams. The beam combiner has a small size and a low cost for manufacture.

DETAILED DESCRIPTION OF THE INVENTION

Figure 1:
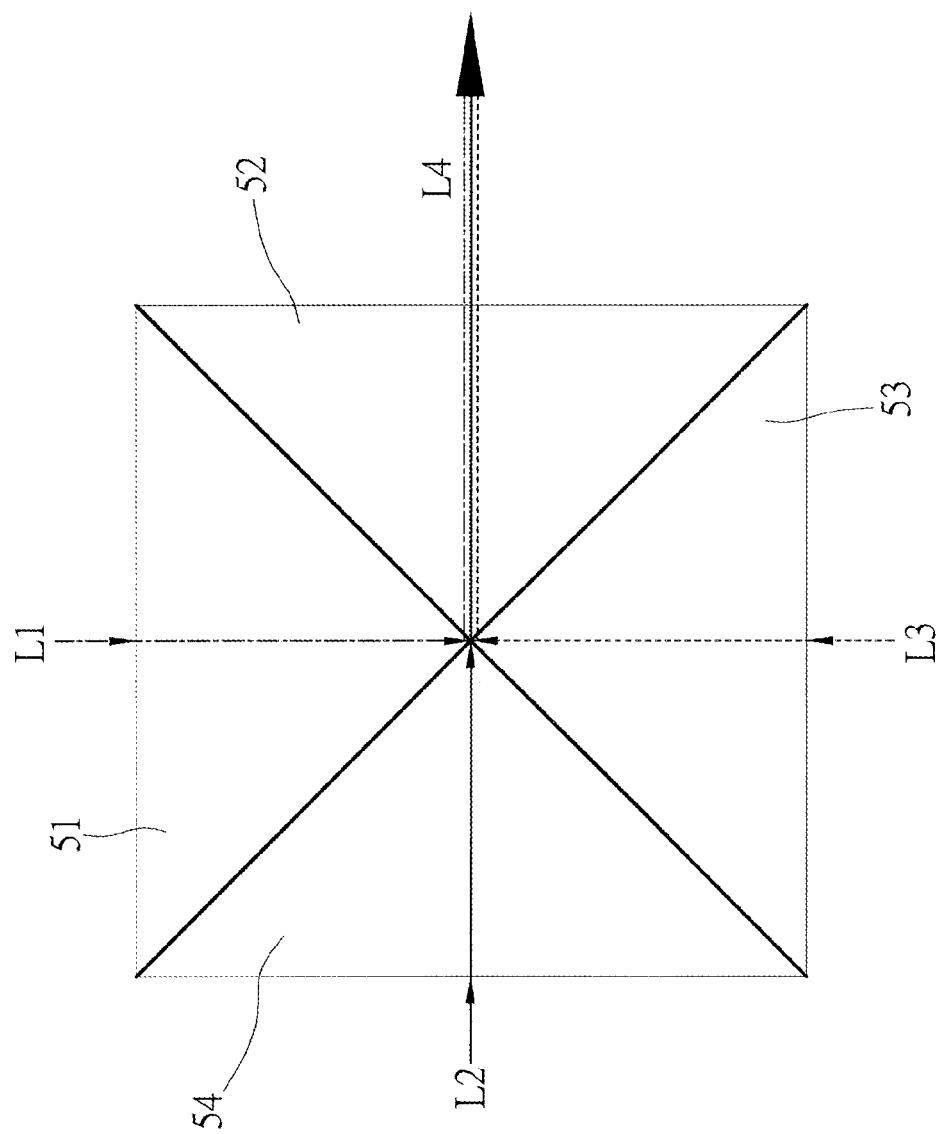
FIG. 1 is a sketch diagram of the first conventional beam combiner.
Figure 2:
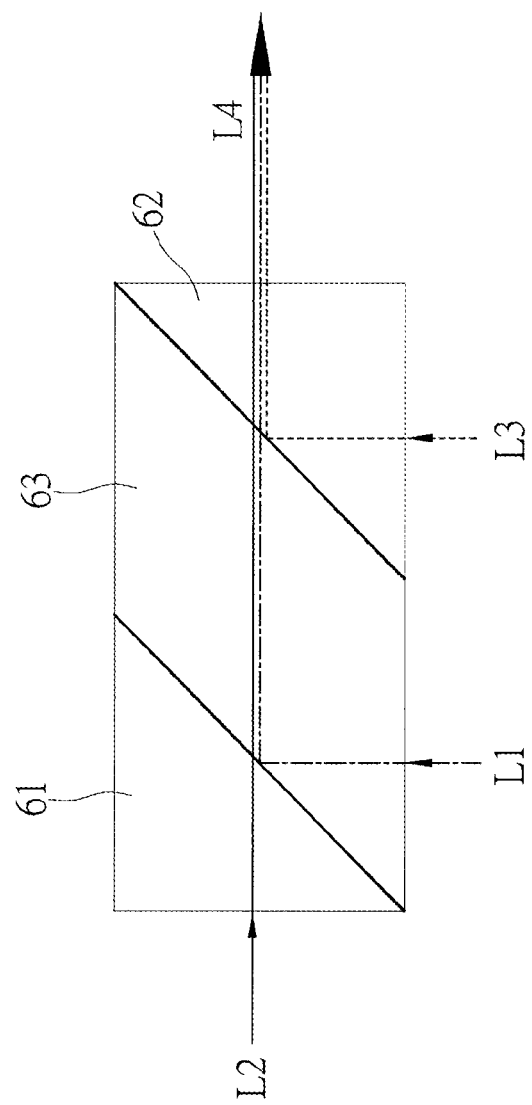
FIG. 2 is a sketch diagram of the second conventional beam combiner.
Figure 3:
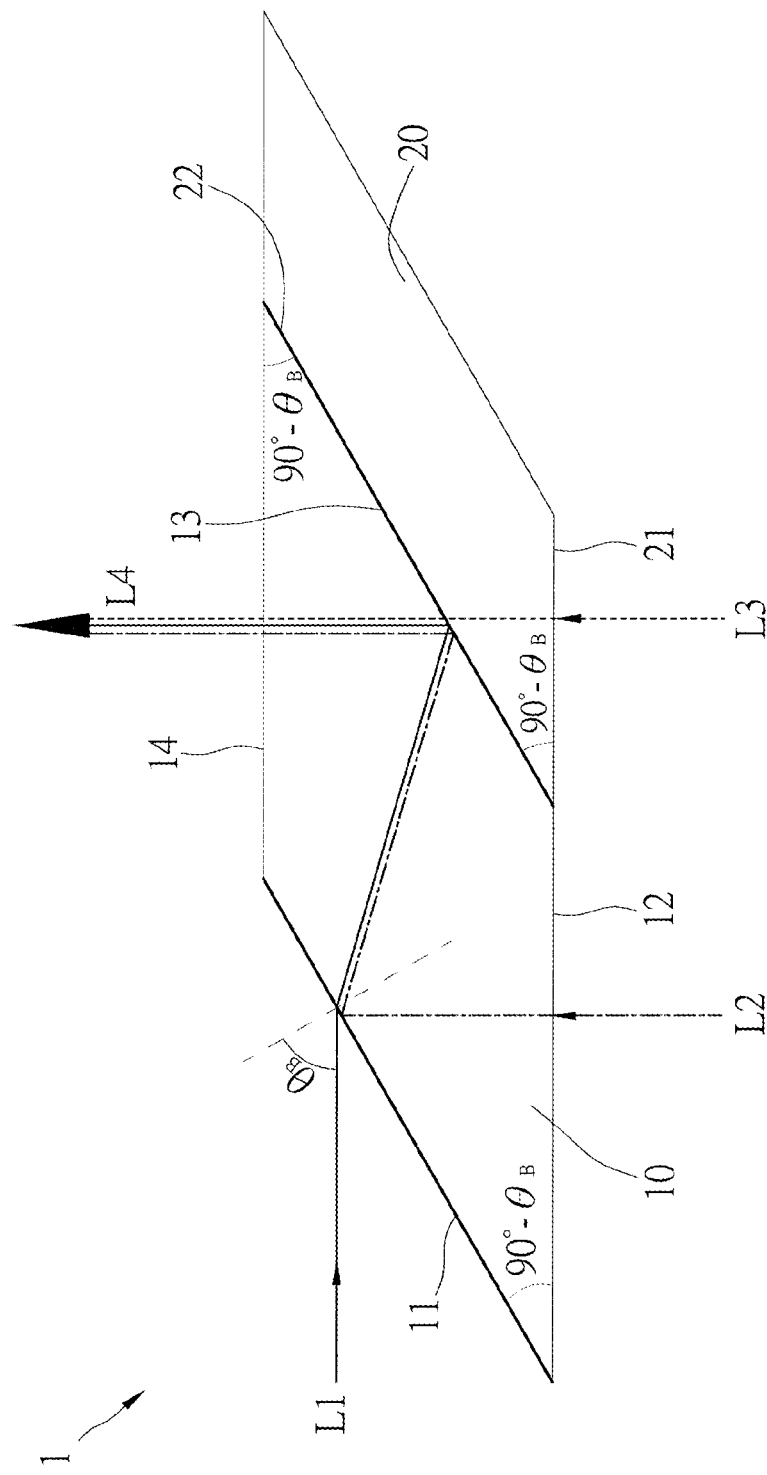
FIG. 3 is a sketch diagram of a first preferred embodiment of the present invention.

As shown in FIG. 3, a beam combiner 1 of the first preferred embodiment of the present invention is capable of combining a first color light beam L1, a second color light beam L2, and a third color light beam L3 to form a composite light beam L4. In the present invention, the first color light beam L1 is green beam, the second color light beam is blue beam, and the third color light beam is red beam. The beam combiner 1 includes a first lens 10 and a second lens 20. In the present invention the first and the second lenses 10, 20 are glass plates. Moreover, the present invention the first and the second lenses 10, 20 are glass panels, and the first lens 10 and the second lens 20 are combined together and become a prime.

The first lens 10 has a first incidence surface 11, a second incidence surface 12, a splitting face 13, and an exit surface 14. The first incidence surface 11 is parallel to the splitting face 13, and the second incidence surface 12 is parallel to the exit surface 14. Included angles between the first incidence surface 11 and the second incidence surface 12 and between the splitting face 13 and the exit surface 14 are ninety (90) degrees minus Brewster's angle $\theta_B$.

The first incidence surface 11 is coated with a first beam-splitting film to allow the first color light beam L1 to transmit through and reflect the second color light beam L2. The splitting face 13 is coated with a second beam-splitting film to allow the third color light beam to transmit through and reflect the first and the second color light beams L1, L2.

The second lens 20 has a third incidence surface 21 and a pass-through face 22. An included angle between the third incidence surface 21 and the pass-through face 22 is ninety (90) degrees minus Brewster's angle $\theta_B$ as well. The pass-through face 22 of the second lens 20 is glued to the splitting face 13 of the first lens 10 that the third incidence surface 21 is parallel to the exit surface 14, and the pass-through face 22 is parallel to the first incidence surface 11.

The first color light beam L1, which is parallel to the second incidence surface 12, enters the first lens 10 via the first incidence surface 11 with an incidence angle of Brewster's angle $\theta_B$. The first color light beam L1 is refracted at the first incidence surface 11 and emits to the splitting face 13 to be reflected at the splitting face 13 and come out of the first lens 10 via the exit surface 14.

The second color light beam L2, which is perpendicular to the second incidence surface 12 and the first color light beams L1, enters the first lens 10 via the second incidence surface 12. Then, the second color light beam L2 is reflected at the first incidence surface 11 to emit to the first beam-splitting film in the same path as the first color light beam L1 and then is reflected at the splitting face 13 to emit to the exit surface 14.

The third color light beam L3, which is perpendicular to the third incidence surface 21 and parallel to the second color light beam L2, enters the second lens 20 via the third incidence surface 21. Then, the third color light beam L3 comes out of the second lens 20 via and enters the first lens 10 via the splitting face 13. The third color light beam L3 is combined with the first color light beam L1 and the second color light beam L2 to form the composite beam L4, and comes out of the first lens via the exit surface 14 in a direction perpendicular to the exit surface 14

Therefore, the present invention provides two lenses 10, 20, the beam-splitting films, and the incidence angle of the first color light beam L1 is limited in Brewster's angle $\theta_B$ to achieve the functions of reducing the size and combining the color light beams.

Figure 4:
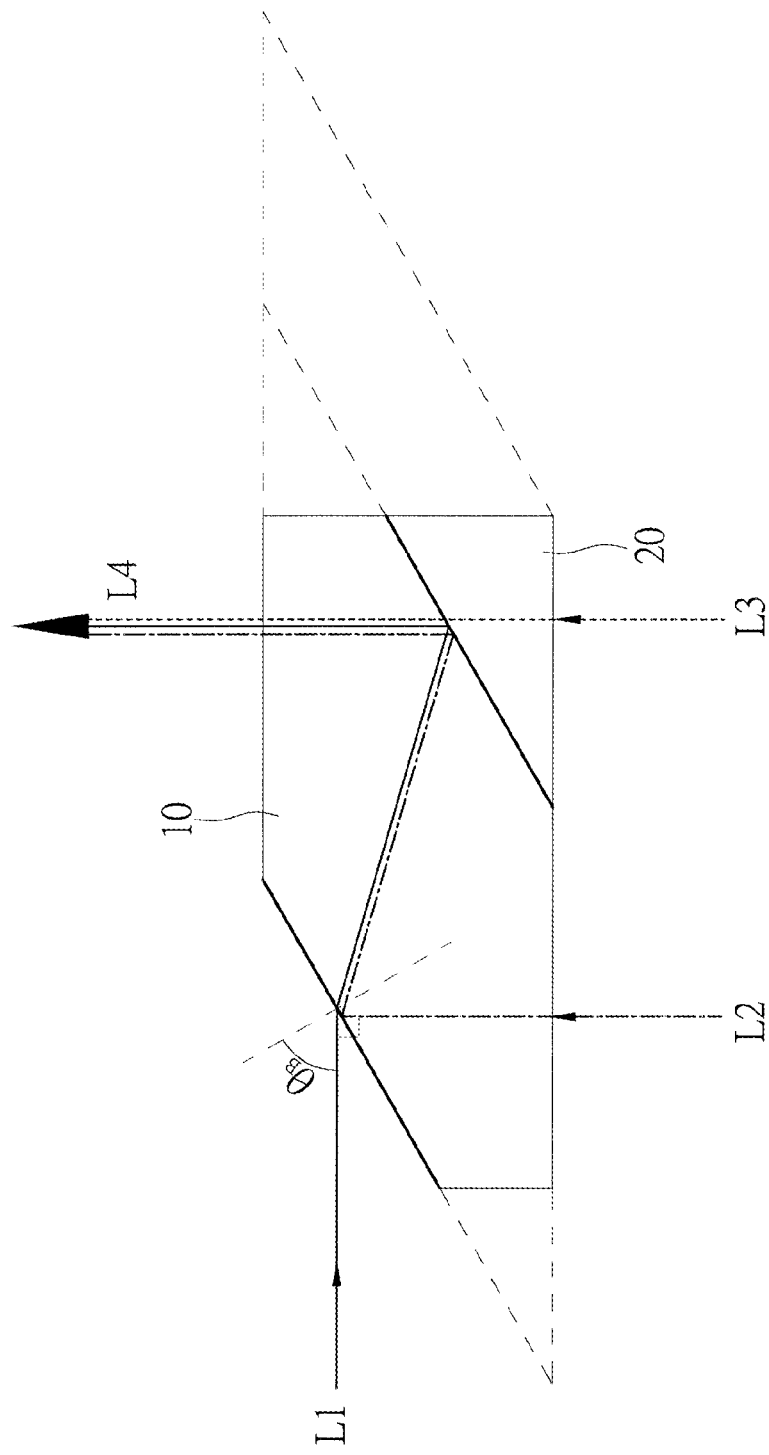
FIG. 4 is a sketch diagram of the first preferred embodiment of the present invention, showing the size reduction.

The beam combiner 1 of the first preferred embodiment basically is a parallelogram. FIG. 4 shows a beam combiner of the second preferred embodiment of the present invention, which basically is the same as the beam combiner 1 of the first preferred embodiment, having a first lens 10 and a second lens 20. The second preferred embodiment cuts off the nonfunctional portions, the opposite corners (shown as the dot lines), of the beam combiner to reduce the size.

Figure 5:
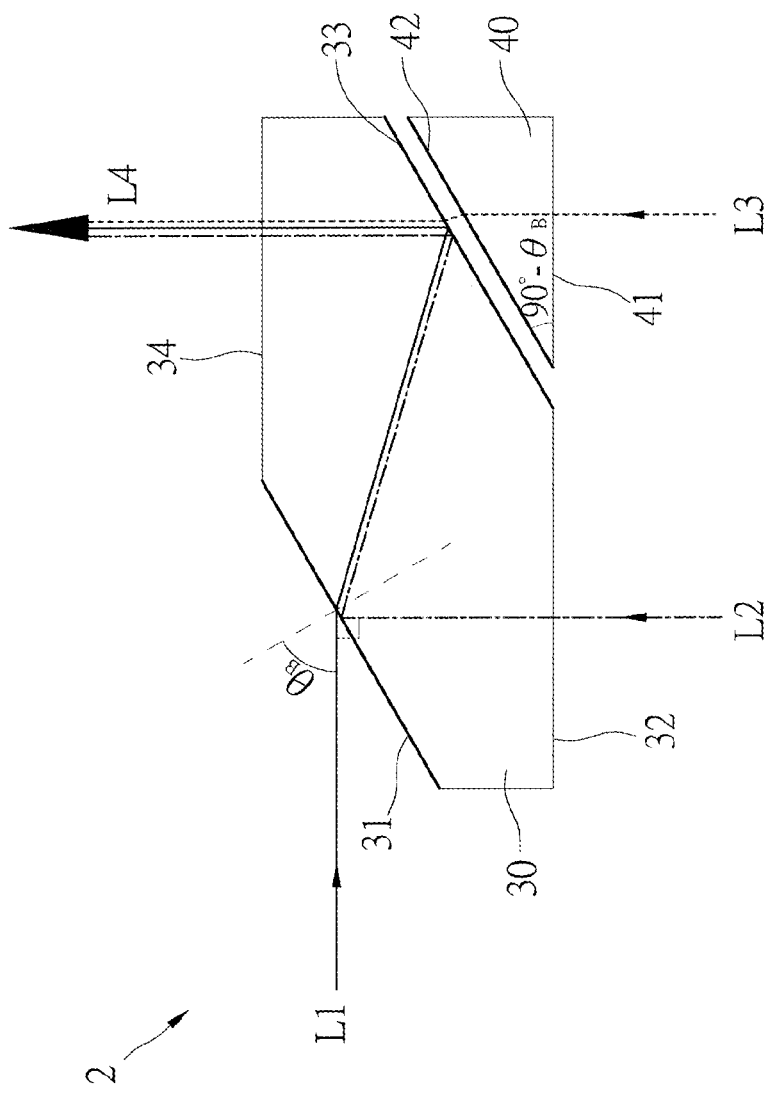
FIG. 5 is a sketch diagram of a second preferred embodiment of the present invention.

As shown in FIG. 5, a beam combiner 2 of the third preferred embodiment of the present invention includes a first lens 30 and a second lens 40. The first lens 30 is the same as the first lens 10 of the first embodiment, having a first incidence surface 31, a second incidence surface 32, a splitting face 33, and an exit surface 34, and the second lens 40 is the same as the second lens 20 of the first embodiment as well, having a third incidence surface 41 and a pass-through face 42. In the third preferred embodiment, the first lens 30 is separated from the second lens 40, and the second lens 40 is coated with an anti-reflection film on the pass through face 42. The anti-reflection film may help the third color light beam L3 to transmit through the pass-through face 42.

The function of the beam combiner 2 of the third preferred embodiment is the same as the beam combiner 1 of the first preferred embodiment. The first and the second color light beams L1, L2 enter the first lens 30 via the first incidence surface 31 and the second incidence surface 32 respectively, and the third color light beam L3 enters the second lens via the third incidence surface 41, and then the first, the second, and the third color light beams L1, L2, L3 are combined together to form a composite light beam L4 and come out via the exit surface 34.

The beam combiner 2 of the third preferred embodiment of the present invention provides two separated lenses coated with specific optical films to combine color light beams, and the incidence angle of the first color light beam L1 is limited in Brewster's angle $\theta_B$ at may achieve the same function.

In conclusion, the beam combiner of the present invention only needs two lenses to combine color light beams. The present invention has a small size and a low cost for manufacture, and no tolerance problem.

The description above is a few preferred embodiments of the present invention and the equivalence of the present invention is still in the scope of claim construction of the present invention.

What is claimed is:

1. A beam combiner for combining a first color light beam, a second color light beam, and a third color light beam to form a composite light beam, comprising:

a first lens having a first incidence surface, a second incidence surface, a splitting face, and an exit surface, wherein the first incidence surface is parallel to the splitting face, an included angle between the first incidence surface and the second incidence surface is ninety degrees minus Brewster's angle, the first incidence surface is coated with a first beam-splitting film to allow the first color light beam to transmit through and reflect the second color light beam, and the splitting face is coated with a second beam-splitting film to allow the third color light beam to transmit through and reflect the first light beam and the second color light beam; and a second lens having a third incidence surface and a pass-through face, wherein the third incidence surface is parallel to the exit surface of the first lens and the pass-through face is parallel to the first incidence surface, and the pass-through face faces the splitting face of the first lens;

the first color light beam, which is parallel to the second incidence surface, entering the first lens via the first incidence surface with an incidence angle of Brewster's angle, and then emitting to the splitting face to be reflected and come out of the first lens via the exit surface;

the second color light beam, which is perpendicular to the second incidence surface and the first color light beam, entering the first lens via the second incidence surface, and then reflected at the first incidence surface and emitting to the splitting face in the same path of the first color beam to be reflected and come out of the first lens via the exit surface in the same path of the first color beam;

the third color light beam, which is perpendicular to the third incidence surface and is parallel to the second color light beam, entering the second lens via the third incidence surface, and then leaving the second lens via the pass-through face and entering the first lens via the splitting face to be combined with the first color light beam and the second color light beam to form the composite light beam and come out of the first lens via the exit surface.

2. The beam combiner as defined in claim 1, wherein the pass-through face of the second lens is attached to the splitting face of the first lens by glue.

3. The beam combiner as defined in claim 1, wherein the pass-through face of the second lens is separated from the splitting face of the first lens, and the second lens is coated with an anti-reflection film on the pass-through face.

4. The beam combiner as defined in claim 1, wherein the second incidence surface of the first lens is parallel to the exit surface, and an included angle between the exit surface and the splitting face is ninety degrees minus Brewster's angle.

5. The beam combiner as defined in claim 4, wherein the composite light beam comes out of the first lens in a direction perpendicular to the exit surface.

6. The beam combiner as defined in claim 1, wherein the second input face of the first lens is parallel to the exit surface.

7. The beam combiner as defined in claim 6, wherein an included angle between the third incidence surface of the second lens and the pass-through face is ninety degrees minus Brewster's angle.

8. The beam combiner as defined in claim 1, wherein the first lens is a glass plate.

9. The beam combiner as defined in claim 1, wherein the second lens is a glass plate.

10. The beam combiner as defined in claim 1, wherein the first lens and the second lens are glass panels.

11. The beam combiner as defined in claim 10, wherein the first lens and second lens are combined and become a prime.

12. A beam combiner, comprising:
a first lens having a first incidence surface coated with a first beam-splitting film to allow a first color light beam to transmit through and reflect a second color light beam; a second incidence surface to allow the second color light beam to transmit through; wherein an included angle between the first incidence surface and the second incidence surface is ninety degrees minus Brewster's angle; a splitting face coated with a second beam-splitting film to allow a third color light beam to transmit through and reflect the first light beam and the second color light beam; and an exit surface to allow the first light beam, the second color light beam, and third color light beam to transmit through; and
a second lens having a third incidence surface and a pass-through face respectively to allow third color light beam to transmit through, wherein the second lens is provided at a side of the first lens with the pass-through face facing the splitting face of the first lens and the third incidence surface parallel to the exit surface of the first lens.

13. The beam combiner as defined in claim 12, wherein the pass-through face of the second lens is parallel to the first incidence surface of the first lens.

14. The beam combiner as defined in claim 12, wherein the pass-through face of the second lens is attached to the splitting face of the first lens by glue.

15. The beam combiner as defined in claim 12, wherein the pass-through face of the second lens is separated from the splitting face of the first lens, and the second lens is coated with an anti-reflection film on the pass-through face.

16. The beam combiner as defined in claim 12, wherein the second incidence surface of the first lens is parallel to the exit surface, and an included angle between the exit surface and the splitting face is ninety degrees minus Brewster's angle.

17. The beam combiner as defined in claim 16, wherein a composite light beam comes out of the first lens in a direction perpendicular to the exit surface.

18. The beam combiner as defined in claim 12, wherein the second incidence surface of the first lens is parallel to the exit surface.

19. The beam combiner as defined in claim 18, wherein an included angle between the third incidence surface of the second lens and the pass-through face is ninety degrees minus Brewster's angle.

20. The beam combiner as defined in claim 12, wherein the first lens is a glass plate.

21. The beam combiner as defined in claim 12, wherein the second lens is a glass plate.

22. The beam combiner as defined in claim 12, wherein the first lens and the second lens are glass panels.

23. The beam combiner as defined in claim 22, wherein the first lens and second lens are combined and become a prime.

* * * * *